(No Model.) 2 Sheets—Sheet 1.
M. H. STEPHENS.
TREE BOX.
No. 572,133. Patented Dec. 1, 1896.
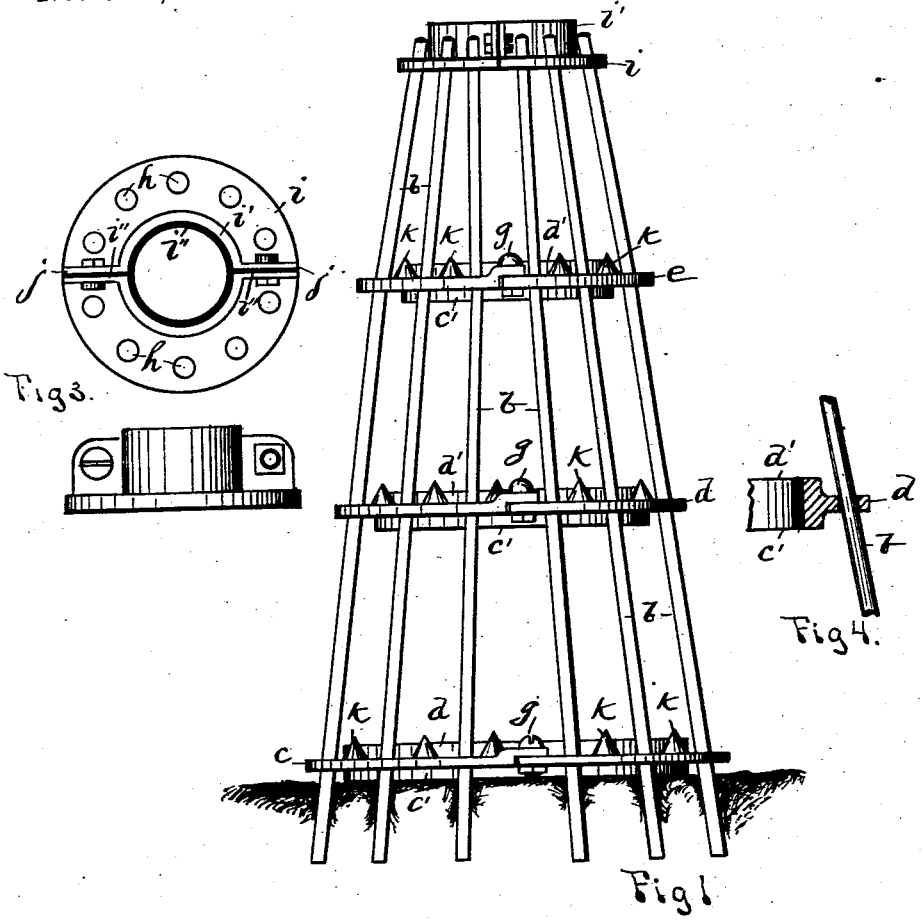
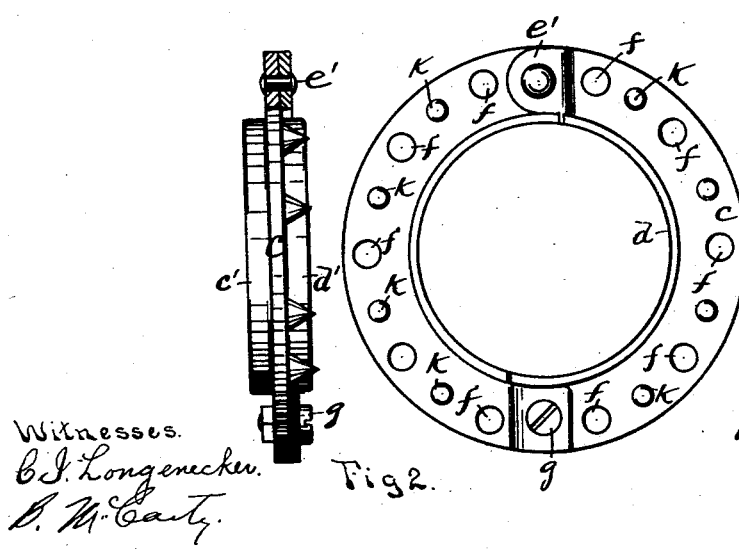
Witnesses.
C. J. Longenecker.
B. McCarty.
M. H. Stephens.
Inventor
A. J. McCarty.
his Attorney.

(No Model.) 2 Sheets—Sheet 2.

M. H. STEPHENS.
TREE BOX.

No. 572,133. Patented Dec. 1, 1896.

UNITED STATES PATENT OFFICE.

MORDECAI H. STEPHENS, OF DAYTON, OHIO.

TREE-BOX.

SPECIFICATION forming part of Letters Patent No. 572,133, dated December 1, 1896.

Application filed February 8, 1896. Serial No. 578,473. (No model.)

*To all whom it may concern:*

Be it known that I, MORDECAI H. STEPHENS, a citizen of the United States, residing at Dayton, in the county of Montgomery and State of Ohio, have invented certain new and useful Improvements in Tree-Boxes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in tree-boxes.

The object of the invention is to provide a tree-box to act both as a protection and a support for the tree.

A further object is to provide a tree-box that admits of an adjustment or expansion, whereby means are provided for protecting and supporting a tree at any stage of its growth and during said growth.

A further object is to provide a tree-box that may be set up without the aid of special tools or implements.

To these ends the improvements consist of a construction and arrangement of parts as will hereinafter more fully appear.

Figure 5:
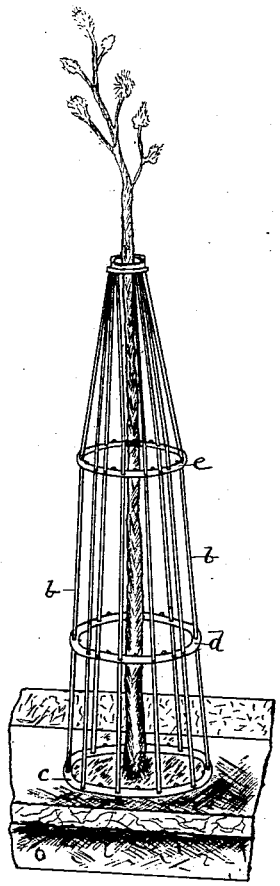
Figure 6:
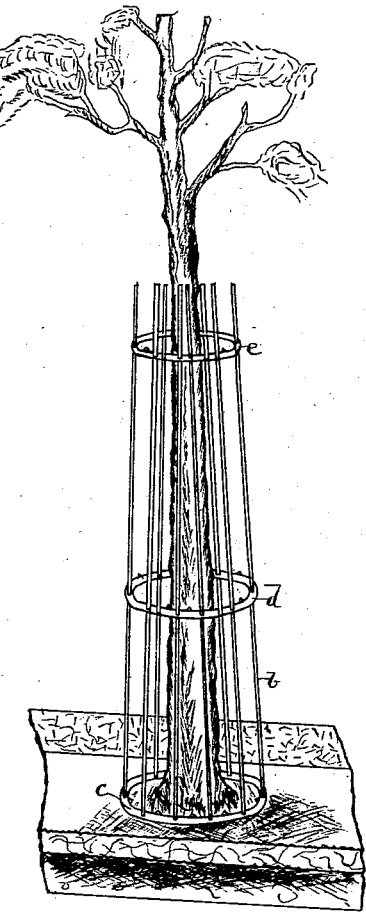

Referring to the annexed drawings, forming a part of this application, Figure 1 is a vertical elevation of my improved tree-box. Fig. 2 are top and edge views of one of the rings. Fig. 3 are similar views of the top ring or collar. Fig. 4 is a sectional view of one of the rings on the line $a\ a$, Fig. 2, showing a portion of one of the rods. Fig. 5 is an elevation of the tree-box inclosing a young tree and in which the upper end thereof is contracted. Fig. 6 is a similar view showing the tree-box inclosing a tree of advanced growth.

In a detailed description similar letters of reference indicate corresponding parts throughout the different views.

$b$ designates a number of rods, preferably round, and having the lower ends projected a suitable distance into the ground.

$c$, $d$, and $e$ designate, respectively, three rings, each of which is provided with upwardly and downwardly projecting flanges $c'$ and $d'$ and is permanently hinged at $e'$. These rings, as is clearly shown in Fig. 1, are graduated in size and are each provided with a series of holes $f$, through which the rods $b$ are inserted, and by means of which said rods are maintained in a uniformly-slanting position, as shown. The lower one of these rings when in position normally rests upon the ground, and the opening ends of said rings are secured by means of bolts $g$. It will be readily understood that the upper rings $d$ and $e$ will be supported in the proper position by the rods, owing to the converging or inclining positions of said rods. The upper ends of the rods $b$ project in a similar manner through openings $h$ in a collar $i$, which is constructed as shown in Fig. 3. This collar has a flange $i'$ projecting above the upper ends of the rods to prevent the ends of the rods from coming in contact with the tree, and said collar is further provided with a soft surface $i''$, made of leather, rubber, or similar substance, which is held in position by being clamped between the ears $j$ of said collar. The object of this cushion is to protect the tree from contact with the hard surface of the collar. The said collar is maintained in its position in a way similar to the rings $d$ and $e$ by the contraction of the rods $b$.

It will be seen that a tree-box constructed after the foregoing description is free from any separate attaching devices by which the rings and rods are secured to each other. In young trees it is desirable that there be some space between the collar $i$ and the tree, but this space is not sufficient to permit the tree's swaying back and forth, as is the case in ordinary tree-boxes. The said collar is a support at the upper end of the tree-box for the tree, and after the growth of the tree has filled said collar it should be removed and the intermediate rings $d$ and $e$ raised a sufficient distance to permit the rods $b$ to expand and increase the area or space at the upper end. It will thus be seen that during the period in which the tree is growing the collar $i$ acts as a support to prevent its bending. Also during this period the portion of the tree inclosed by the box may be secured in a straightened position by strapping or tying it to any one of the rods.

The converging arrangement of the rods $b$ is a very important feature of my invention, as thereby I am enabled to limit the space at the upper end of the box, and thus provide a support to prevent a too free movement of said tree.

In order to prevent children and others from climbing upon the box, I provide each of the rings with a series of spikes $k$ between the rods.

Having fully described my invention, I claim as new and desire to secure by Letters Patent—

1. In a tree-box, the combination with a plurality of straight rods, of rings $c$ $d$ and $e$ loosely inclosing said rods each of which is provided with upwardly-projecting points $k$, a collar $i$ loosely supported on the upper ends of said rods, the said collar having a flange $i'$ that projects above the upper ends of said rods and intervenes between said ends and the tree, and an annular cushion on the inner side of said flange, the said cushion being secured between the adjoining parts of the flange and lining the interior surface thereof, as herein shown and described.

2. In a tree-box, the combination of a series of straight rods, a series of graduated rings inclosing said rods and adapted to maintain them in an inclined position with their upper ends uniformly converging toward the center, a collar $i$ loosely mounted on the upper ends of said rods and adapted to be raised therefrom, the said collar having a flange $i'$ projecting upwardly, an annular elastic cushion lining the interior of said flange and secured between the adjoining ends thereof, whereby means are provided for increasing the area of space inclosed by the upper ends of said rods without necessitating the removal of the rods, substantially as described.

In testimony whereof I affix my signature in presence of two witnesses.

MORDECAI H. STEPHENS.

Witnesses:
R. J. McCarty,
S. A. Dickson.